US012741906B2

(12) United States Patent
Fortin

(10) Patent No.: US 12,741,906 B2
(45) Date of Patent: Sep. 22, 2026

(54) POZZOLAN-BASED ADDITIVE AGENT AND USES THEREOF

(71) Applicant: HEC0 INNOVATION CHANVRE INC., Mirabel (CA)

(72) Inventor: Philippe Fortin, Mirabel (CA)

( * ) Notice: Subject to any disclaimer, the term of this patent is extended or adjusted under 35 U.S.C. 154(b) by 0 days.

(21) Appl. No.: 19/389,152

(22) Filed: Nov. 14, 2025

(65) Prior Publication Data

US 2026/0070842 A1 Mar. 12, 2026

Related U.S. Application Data

(63) Continuation of application No. 19/302,426, filed on Aug. 18, 2025.

(60) Provisional application No. 63/687,929, filed on Aug. 28, 2024.

(51) Int. Cl.

| | |
|---|---|
| ***C04B 14/10*** | (2006.01) |
| ***C04B 18/02*** | (2006.01) |
| ***C04B 18/24*** | (2006.01) |
| ***C04B 24/38*** | (2006.01) |
| ***C04B 28/12*** | (2006.01) |
| ***C04B 40/00*** | (2006.01) |

(52) U.S. Cl.

CPC .......... *C04B 14/106* (2013.01); *C04B 18/021* (2013.01); *C04B 18/248* (2013.01); *C04B 24/383* (2013.01); *C04B 28/12* (2013.01); *C04B 40/0042* (2013.01)

(58) Field of Classification Search

CPC ... C04B 14/106; C04B 18/021; C04B 18/248; C04B 24/383; C04B 28/12; C04B 40/0042

See application file for complete search history.

(56) References Cited

FOREIGN PATENT DOCUMENTS

| | | | | | |
|---|---|---|---|---|---|
| CA | 3198480 A1 | | 12/2023 | | |
| CN | 109970421 A | * | 7/2019 | ............ | C04B 28/06 |
| CN | 110407554 A | * | 11/2019 | ............ | B32B 13/02 |
| CN | 114716195 A | * | 7/2022 | ............ | C04B 28/00 |
| DE | 102017222488 B3 | * | 3/2019 | ............ | C04B 28/08 |
| GB | 2591262 A | | 7/2021 | | |
| JP | 2004123535 | | 4/2004 | | |
| JP | 2006070563 A | * | 3/2006 | ............... | E01C 7/35 |
| KR | 102012077747 A | * | 7/2012 | ................ | C09J 1/02 |
| KR | 102205003 B1 | * | 1/2021 | ........... | C04B 14/303 |
| KR | 102299985 B1 | * | 9/2021 | ........... | C04B 14/041 |
| PL | 241823 | * | 12/2018 | ............ | C04B 28/04 |
| WO | 2018083421 A1 | | 5/2018 | | |
| WO | 2022157466 | | 7/2022 | | |

OTHER PUBLICATIONS

Hirst E. Characterization of Hemp-Lime as Composite Building Material., Ph.D. thesis, University of Bath. 2013. United Kingdom.
Fortin Philippe. Formulation d'un liant pouzzolanique pour la confection d'un béton végétal hygroscopique., Master's thesis. École de Technologie Supérieure, Université du Québec. 2022. Canada.
Fortin Philippe. Formulation of a pozzolanic binder for the production of hygroscopic plant-based concrete (Machine-translation of : Formulation d'un liant pouzzolanique pour la confection d'un béton végétal hygroscopique), Master's thesis. École de Technologie Supérieure, Université du Québec. 2022. Canada.

* cited by examiner

*Primary Examiner* — Anthony J Green
(74) *Attorney, Agent, or Firm* — DECODE Legal Inc.

(57) ABSTRACT

An additive agent comprising pozzolan and methylcellulose, for the preparation of a concrete mixture of a hygroscopic vegetal-based concrete material comprising lime and the additive agent is described herein. The lime may be hydrated lime and the pozzolan may be a metakaolin. Proportions of each element are between 50% to 80% by weight of lime, between 20% and 50% by weight of pozzolan and between 0.3% and 1.5% by weight of methylcellulose. A concrete mixture and a solid concrete material made from such mixture include hemp hurds as an aggregate. The additive agent may also be used in the preparation of a concrete mixture or of a binder formulation for use in the concrete mixture. A variety of applications including prefabricated construction components are made from this material.

17 Claims, 4 Drawing Sheets

POZZOLAN-BASED ADDITIVE AGENT AND USES THEREOF

CROSS REFERENCE

This application is a continuation of U.S. application Ser. No. 19/302,426, filed on Aug. 18, 2025, the entire contents of which are incorporated herein by reference, and claims the benefit of priority to U.S. Provisional Patent Application No. 63/687,929, filed on Aug. 28, 2024, the entire contents of which are incorporated herein by reference.

FIELD OF THE INVENTION

The present description generally relates to the field of building materials. More specifically, the present description relates to a pozzolan-based additive comprising methylcellulose that may be admixed with a binder, a solid plant-based concrete material comprising the additive and a method for making such a material.

BACKGROUND

Climate change is driving the need to rethink the way buildings are constructed to limit greenhouse gas (GHG) emissions. A building emits GHGs from the extraction of materials, during its operation and until its disposal at the end of its life. The use of petrochemicals and mineral-based insulation materials goes against the societal duty to reduce GHGs. A material with great potential is the hemp concrete composed of a lime-based binder, hemp hurds and water. Hemp is a plant that can be harvested during each growing season. It can quickly sequester carbon dioxide ($CO_2$), a GHG, up to four times more than a tree according to studies. In addition, hemp concrete can regulate humidity and temperature in a natural way in a building through the absorption capacity of hemp concrete, thus bringing comfort to the residents. Hemp concrete is a good thermal insulator, recyclable, non-flammable, natural pest repellent and protects against wood mold. However, many construction methods remain artisanal and require a lot of labor. The importation of formulated binders or natural hydraulic lime marketed in Europe makes hemp plant-based concrete material inaccessible and unviable for the North American market.

There is therefore a need for a binder formulation that is adapted to vegetal hemp concrete using materials available in North America, while limiting the addition of a hydraulic binder, which is a major GHG emitter.

SUMMARY

In a first aspect, described herein is an additive agent comprising pozzolan and methylcellulose, for use in the preparation of a solid concrete material, a concrete mixture or a binder formulation for use in a concrete mixture.

The pozzolan comprised in the additive agent may be metakaolin.

The additive agent may be provided in combination with a binder and an aggregate.

In another aspect, described herein is an additive agent comprising pozzolan and methylcellulose, for combination with a binder and an aggregate, for use in the preparation of a solid concrete material.

In another aspect, described herein is a solid concrete material comprising a binder having lime, an additive agent comprising pozzolan and methylcellulose and an aggregate having vegetal fibers, wherein the aggregate and the additive are dispersed within the binder.

The vegetal fibers may be hemp hurds.

The solid concrete material may comprise between 20% and 50% by weight of hemp hurds, between 30% and 50% by weight of hemp hurds, or may comprise approximately 40% by weight of hemp hurds. It may be preferable that the concrete solid concrete material described herein comprises 40% by weight of hemp hurds.

The hemp hurds may comprise chips between 5 mm and 40 mm long by 2 mm to 10 mm wide, or chips between 20 mm to 30 mm long by 3 mm to 6 mm wide, or a combination thereof. It may be preferable for the hemp hurds to be between 20 mm to 30 mm long by 3 mm to 6 mm wide.

In another aspect, described herein is a solid concrete material comprising a binder having lime, an additive agent comprising pozzolan and methylcellulose and an aggregate having vegetal fibers, wherein the aggregate and the additive are dispersed within the binder wherein a matrix comprises a dry portion having the binder and the additive agent, the dry portion having:

- between 50% to 80% by weight of hydrated lime;
- between 20% and 50% by weight of pozzolan; and
- between 0.3% and 1.0% by weight of methylcellulose.

The dry portion may also have:

- between 49% to 51% by weight of hydrated lime;
- between 49% and 51% by weight of pozzolan; and
- between 0.3% and 1.0% by weight of methylcellulose.

In another aspect, described herein is a solid concrete material comprising a binder having lime, an additive agent comprising pozzolan and methylcellulose and an aggregate having vegetal fibers, wherein a matrix comprises a dry portion having the binder and the additive agent, the dry portion having:

- between 65% to 66.5% by weight of hydrated lime;
- between 33% and 34.5% by weight of pozzolan; and
- 0.5% by weight of methylcellulose.

In another aspect, described herein is a solid concrete material comprising a binder having lime, an additive agent comprising pozzolan and methylcellulose and an aggregate having vegetal fibers, wherein a matrix comprises a dry portion having the binder and the additive agent, the dry portion having:

- hydrated lime and pozzolan in a 2:1 ratio by weight; and
- 0.5% by weight of methylcellulose.

In another aspect, described herein is a concrete mixture comprising: a binder having lime;

- an additive agent comprising pozzolan and methylcellulose;
- an aggregate having vegetal fibers; and
- water, wherein the aggregate is coated at least partially by a paste made of the binder, the additive agent and the water. The lime may be hydrated lime. The vegetal fibers may be hemp hurds.

The lime comprised in the binder may be hydrated lime.

In another aspect, the concrete mixture may comprise between 20% and 50% by weight of hemp hurds, or may comprise approximately 40% of hemp hurds. It may be preferable that the concrete mixture comprises 40% of hemp hurds.

The hemp hurds may comprise chips between 5 mm and 40 mm long by 2 mm to 10 mm wide, or may comprise chips 20 mm to 30 mm long by 3 mm to 6 mm wide, or a combination thereof. It may be preferable that the chips be 20 mm to 30 mm long by 3 mm to 6 mm wide.

In another aspect, described herein is a concrete mixture comprising a binder having lime, an additive agent comprising pozzolan and methylcellulose, an aggregate having vegetal fibers; and water, wherein the aggregate is coated at least partially by a paste made of the binder, the additive agent and the water, wherein a matrix comprises a dry portion having the binder and the additive agent, the dry portion having: between 65% to 66.5% by weight of hydrated lime; between 33% and 34.5% by weight of pozzolan; and 0.5% by weight of methylcellulose. The dry portion may also have between 49% to 51% by weight of hydrated lime; between 49% and 51% by weight of pozzolan; and 0.5% by weight of methylcellulose. The dry portion may also have between 50% to 80% by weight of hydrated lime; between 20% and 50% by weight of pozzolan; and between 0.3% and 1.0% by weight of methylcellulose.

In another aspect, the dry portion of the matrix, having the binder and the additive agent, may have hydrated lime and pozzolan in a 2:1 ratio by weight; and 0.5% by weight of methylcellulose.

In another aspect, described herein is a method of making a solid concrete material comprising coating at least partially the vegetal fiber with a paste made of the binder, an additive agent comprising pozzolan and methylcellulose and water.

In another aspect, described herein is a construction material comprising a solid concrete material, the solid concrete material comprising a binder having lime, an additive agent comprising pozzolan, and an aggregate having vegetal fibers, wherein the aggregate and the additive are dispersed within the binder; the construction material having the form of a panel, the weight of the binder being between 1.5 and 2.5 times a weight of the aggregate in the panel.

In another aspect, described herein is a binder formulation that may be used in a concrete mixture of a hygroscopic vegetal-based concrete material, the binder formulation comprising lime and an additive agent comprising pozzolan and methylcellulose. The lime may be hydrated lime.

In another aspect, described herein is a binder formulation comprising:

between 50% to 80% by weight of hydrated lime;
between 20% and 45% by weight of pozzolan; and
between 0.3% and 1.0% by weight of methylcellulose.
The binder formulation may also comprise
between 49% to 51% by weight of hydrated lime;
between 49% and 51% by weight of pozzolan; and
between 0.5% and 0.7% by weight of methylcellulose.
The binder formulation may also comprise
between 65% to 66.5% by weight of hydrated lime;
between 33% and 34.5% by weight of pozzolan; and
0.5% by weight of methylcellulose.

In another aspect, described herein is a kit comprising an additive agent comprising pozzolan and methylcellulose and a binder having lime.

In another aspect, described herein is a use of an additive agent comprising pozzolan and methylcellulose in the preparation of a solid concrete material.

In another aspect, described herein is a use of an additive agent of agent comprising pozzolan and methylcellulose in the preparation of a concrete mixture.

In another aspect, described herein is a use of an additive agent comprising pozzolan and methylcellulose in the preparation of a binder formulation for use in a concrete mixture of a hygroscopic vegetal-based concrete material.

It is an object of the present invention to provide a concrete material that overcomes or mitigates one or more disadvantages of known concrete materials, or at least provides a useful alternative.

The invention provides the advantages of providing a light but strong, less expensive, eco-friendlier construction material, especially adapted for production in the North-American region.

DETAILED DESCRIPTION

Figures 1A, 1B:
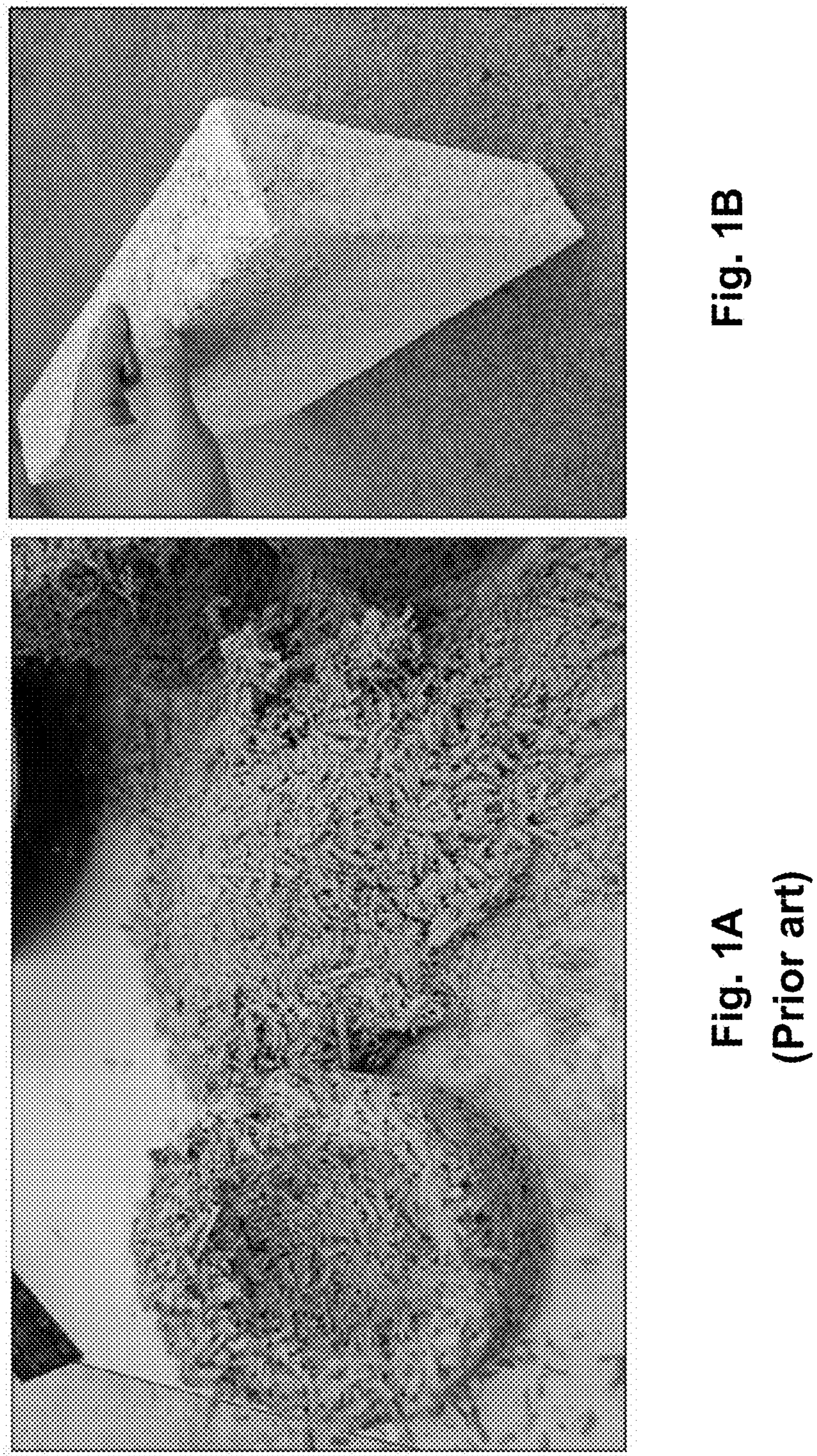
FIG. 1A is a photograph showing a sample of a plant-based concrete sample with poor internal cohesion (chalking phenomenon; image from Hirst, E. (2013). *Characterization of Hemp-Lime as Composite Building Material*. PhD Thesis, University of Bath)
FIG. 1B is a photograph showing a solid plant-based concrete material sample according to an embodiment of the present description.

The present invention relates to an eco-friendly concrete material made from components which cause less Green House Gases (GHG) to be emitted during the steps of their manufacturing and supply chain. Particularly, attention is given to use as much as possible materials sourced in North America. A formulation of a pozzolanic binder for the preparation of a hygroscopic plant-based concrete for building insulation is provided. Finally, an additive agent to be included to the binder formulation for the preparation of a solid concrete material is provided.

The hemp concrete composed of a lime-based binder, hemp hurds and water offers great potential as an eco-conscious material. Hemp is a plant that can be harvested during each growing season. It can quickly sequester carbon dioxide (CO2), a GHG, up to four times more than a tree according to studies. In addition, hemp concrete can regulate humidity and temperature in a natural way in a building through the absorption capacity of hemp concrete, thus bringing comfort to the residents. Hemp concrete is a good thermal insulator, recyclable, non-flammable, natural pest repellent and protects against wood mold.

A formulation of a binder adapted for vegetal hemp concrete, which uses materials available in North America, while limiting the addition of lime or other hydraulic binder(s) to the binder formulation is provided. Such binder, including additives agents, is constituted of lime, in particular and preferably of hydrated lime, and an additive agent, the additive agent comprising a pozzolan, in particular metakaolin, and methylcellulose.

The lime can be either quicklime or hydrated lime. Hydrated lime is calcium hydroxide ($Ca(OH)_2$) while quicklime is calcium oxide (CaO). Quicklime or hydrated lime may be preferred over hydraulic lime as hydraulic lime may be more difficult to procure in North America. Therefore, preferably, quicklime or hydrated lime is used and, more preferably, hydrated lime is used. Without being bound by theory, different lime types may present different compatibilities with the additive agent of the present disclosure.

The benefits of using a pozzolan-based additive in cement and concrete are threefold: first is the economic gain obtained by replacing a substantial part of the cement or Portland cement by cheaper natural pozzolans; second is the lowering of the blended cement environmental cost associated with the greenhouse gases emitted during cement and Portland cement production; and third is the increased durability of the end product. The additive agent of the present disclosure can also be used with a variety of binders, such as lime or hydrated lime of different particle size and quality. Pozzolans added to lime also optimize the curing quality and durability of plant-based concretes. Pozzolans can be used to control setting, increase durability, reduce cost and reduce pollution without significantly reducing the final compressive strength or other performance characteristics. A non-exhaustive list of pozzolans include powder glass, perlite, zeolite, diatomaceous earth, blast furnace slag and metakaolin.

The use of metakaolin as a building material is based mainly on its reactive nature as a pozzolanic cementitious additive. It can also be used in the formulation of mortars, ceramics and porcelain, lime plaster and stucco. It is of growing interest in the development of alkali-activated geopolymers. It is currently used mainly as a cement additive to improve the mechanical strength of cement concretes, reduce porosity and increase durability, particularly in the face of chemical attack and the alkaligranulate reaction (AGR).

Once mixed with water, methylcellulose has been found to increase the viscosity of the binder paste and to compensate to some extent the fragilization of the solidified material caused by the sole use of metakaolin with hydrated lime. Methylcellulose increases ductility of the solidified concrete material and increases tackiness of the binder paste in a concrete mixture. This increased tackiness contributes to increase bonding with aggregates, such as hemp hurds. Methylcellulose has also been found to contribute significantly to mechanical properties of solid concrete material. Methylcellulose contributes to retaining water in the concrete mixture for a longer time, allowing chemical reactions to occur at a slower rate, thereby contributing to such increased performances.

Methylcellulose, or cellulose methyl ether, is cellulose obtained from plant fibrous material and partially etherified with methyl groups. Methylcellulose may be construction grade methylcellulose.

Together as an additive agent, pozzolan and methylcellulose provide a synergistic effect. When including the additive agent of the present disclosure, binder formulations advantageously display improved internal cohesion and improved external cohesion. The first component of the additive agent, the pozzolan, provides for homogenous dispersion of the hydrated lime and methylcellulose, which contributes to improve compressive strength. The second component of the additive agent, methylcellulose, provides for improved internal cohesion of the concrete mixture at early stages of the curing reaction. Finally, the binder, having lime, provides for surface stiffness, providing external cohesion and improved hardness, which will increase as the curing reaction progresses.

When including the additive agent of the present disclosure, binder formulations advantageously allow for use of hydrated lime that may be perceived as of an ordinary or regular provenance as the inclusion of the additive enables the resulting concrete to display properties that would be otherwise only achievable using solely a hydrated binder of a special or improved quality, or with finer particles, which are more expensive and more difficult to source.

Finally, the inclusion of the additive agent of the present disclosure in a binder formulation allows to decrease the proportion of the hydraulic binder (such as hydraulic lime) that would be used in a binder formulation not including the additive agent. A decreased proportion of lime in a binder formulation helps reducing the negative environmental impact of the binder.

It has been found that using the following ratios of components in the binder (dry portion only) may be used:

between 20% and 90% by weight of hydrated lime;
between 10% and 80% by weight of pozzolan; and
between 0.2% and 1.5% by weight of methylcellulose.

It has been found that using the following ratios of components in the binder (dry portion only) may preferably be used:

between 50% to 80% by weight of hydrated lime;
between 20% and 50% by weight of pozzolan; and
between 0.3% and 1.0% by weight of methylcellulose.

It has been found that using the following ratios of components in the binder (dry portion only) may most preferably be used:

about 70% by weight of hydrated lime;
about 29.5% by weight of pozzolan; and
about 0.5% by weight of methylcellulose.

It has been found that using the following ratios of components in the binder (dry portion only) may most preferably be used:

about 50% by weight of hydrated lime;
about 49.3% by weight of pozzolan; and
about 0.7% by weight of methylcellulose.

A binder formulation comprising 49.3% by weight of pozzolan vs. 29.5% by weight of pozzolan allows for reduction of the proportion of the lime component. Decreasing the proportion of the lime component allows for a more cost-effective manufacturing and supply chain, in addition to decreasing the environmental cost or impact of the binder formulation.

To increase flexural strength of the solid concrete material, Portland cement may be added to the dry portion of the binder.

It must be noted that the above proportions refer to hydrated lime. If other types of lime, such as quicklime were to be used with water in place of hydrated lime, the above proportions would be adapted accordingly.

The binder formulations provided herein may be used in the preparation of plant based concrete mixtures and solid concrete materials. Hemp aggregate is made primarily from shredded chips of various sizes from the hemp stalk: hemp hurds, the shredded wood of the plant. To such an extent, hemp hurds may be dispersed as aggregates in the binder, to the extent of between 30% and 50% by weight of hemp hurds, preferably approximately 40% of hemp hurds. The hemp hurds may be chips between 10 mm (0.39 in) and 40 mm (1.57 in) long by 2 mm (0.079 in) to 10 mm (0.39 in) wide, preferably 20 mm (0.79 in) to 30 mm (1.18 in) long by 3 mm (0.12 in) to 6 mm (0.24 in) wide, preferably 5 mm (0.2 in) wide. Without being bound by theory, larger particle size of hemp hurds can lead to better compressive strength. Larger particle sizes reduce both the specific surface area of the aggregate, and the surface area of the binder-aggregate interface. Hemp hurds are fire resistant once coated by lime.

A hygroscopic hemp-based solid concrete may therefore be prepared using the afore described binder with the additive agent having pozzolan (such as metakaolin) and methylcellulose, hemp hurds as aggregates and water. The quantity of water to be added to the concrete mixture depends on the quantity of hemp hurds and on the density of the formulated binder. For example, the volume of water to be added may be equal to the volume of the formulated binder added to the hemp-based concrete mix. The quantity of water may vary between 1.5 and 3.0 times a weight of the aggregate according to the amount of formulated binder added to the hemp-based concrete mix. The lime-based slurry must be relatively fluid to enable an adequate coating of the hemp hurds aggregate. A significant proportion of the water required for hemp concrete is used to compensate for the very high water absorption by the hemp hurds. However, the cohesion of the concrete will rise gradually and slowly with the departure of water, which will ultimately allow the migration of $CO_2$ into the mass for carbonation via the partially dewatered pore.

In accordance with another embodiment of the present invention, a method of making the hygroscopic hemp-based solid concrete material as described is provided during which the vegetal fiber (the hemp hurds aggregate) is at least partially coated by the paste made of the binder, the additive agent and water.

Such hygroscopic hemp-based solid concrete material may be provided under different forms and shapes as a prefabricated building component. In a non-limiting example, such prefabricated building component may take the form of a panel. In such panels made of hygroscopic hemp-based solid concrete material, the hemp hurds additive may represent approximately 33.3% by weight of the total weight of the prefabricated building component while representing approximately 71.5% by volume of its total volume.

EXAMPLES

Example 1: General Composition of an Additive Agent Having Pozzolan and Methylcellulose An additive agent having pozzolan and methylcellulose was prepared. The general composition of the additive was as follows:

Pozzolan: metakaolin; and

Methylcellulose (Methylhydroxyethyl cellulose).

The two components were in a solid, powder form and provided in a 98.5:1.5% dry mass ratio of pozzolan:methylcellulose. The components were weighed, mixed together and bagged. The additive agent was subsequently stored or used as described in the following examples.

Example 2: Formulation of a Binder Comprising an Additive Agent Having Pozzolan and Methylcellulose A binder comprising an additive agent having pozzolan and methylcellulose was prepared. The formulation of the binder was as follows:

66-67% by weight of the binder (hydrated lime);

33-34% by weight of pozzolan (metakaolin); and 0.5% by weight of methylcellulose.

Or hydrated lime and pozzolan in a 2:1 ratio by weight; and 0.5% by weight of methylcellulose.

The components of the formulation were in a solid, powder form and were weighted and mixed together.

Example 3: Preparation of Hemp-Based Concrete Specimens Using Binder Formulations Comprising an Additive Agent Having Pozzolan and Methylcellulose The following binder formulations were prepared.

Formulation A (control): Commercially available binder (pozzolanic hydraulic lime) combined with hemp. This formulation included pozzolan, but not the additive agent of the present disclosure.

Formulation B (control): Commercially available binder (Bondcrete® lime) combined with hemp. This formulation did not include the additive agent of the present disclosure.

Formulation C: 100% hydrated lime (high calcium content, type N) combined with hemp; no additive agent.

Formulation D: 65% hydrated lime (high calcium content, type N) combined with hemp and an additive agent having about 34.5% metakaolin and about 0.5% methylcellulose.

Formulation E: 100% hydrated lime (type S) combined with hemp; no additive agent.

Formulation F: 70% hydrated lime (type S) combined with hemp, and an additive agent having about 29.5% metakaolin and about 0.5% methylcellulose.

While both type N and type S hydrated limes are suitable for the preparation hemp concrete specimens, type S hydrated lime has finer particles than type N hydrated lime. Therefore, it may be viewed as a hydrated lime of improved quality over type N hydrated lime, which in turn has a high calcium content. Type S hydrated lime is also more costly than type N hydrated lime and may be more difficult to produce or provide locally.

The binder dry components recited above were weighed and premixed together, thereby providing a binder formulation. Hemp was added to a mixing tank and pre-wetted. The binder formulation was then added to the pre-wetted hemp into the tank. The contents of the tank were mixed together. Remaining water was added, and the components of the tank underwent final mixing, resulting in a hemp-based concrete paste. All formulations were prepared using a 1.5 mass ratio of dry binder formulation:dry hemp hurds.

Hemp-based concrete rectangular blocks (185 mm×185 mm×203 mm) were subsequently prepared from the plant-based concrete paste using molds and according to molding methods known in the field. The specimens were then stored in a temperature and humidity-controlled room at 21° C.±2° C. and 50%±10% RH. Tests to characterize hemp-based concrete specimens were carried out once a stabilized density had been reached, i.e. after a drying period of at least 60 days.

Example 4: Compressive Strength of the Hemp-Based Concrete Specimens Using Binder Formulations Comprising an Additive Having Pozzolan and Methylcellulose Measurement of compressive strength allows for the assessment of the cohesion levels of a paste or concrete.

Values of 0.2 MPa are generally considered adequate in the field/industry. Compression strength of the hardened hemp-based concrete is measured using a hydraulic press following a 60-day cure at room temperature (21° C.±2° C. and 50%±10% RH). Hemp-based rectangle blocks concrete specimens were prepared as recited in Example 3. The hydraulic press used for the compression test had a capacity of 2000 kN. The force start is set at 0.5 kN and the force application speed is of the order of 0.1 kN/sec. To accurately calculate the maximum compressive stress, the cubes are pre-weighed and measured using a fixed caliper with an accuracy of ±0.01 mm. The test is terminated upon the specimen breaking or cracking.

Figure 2:
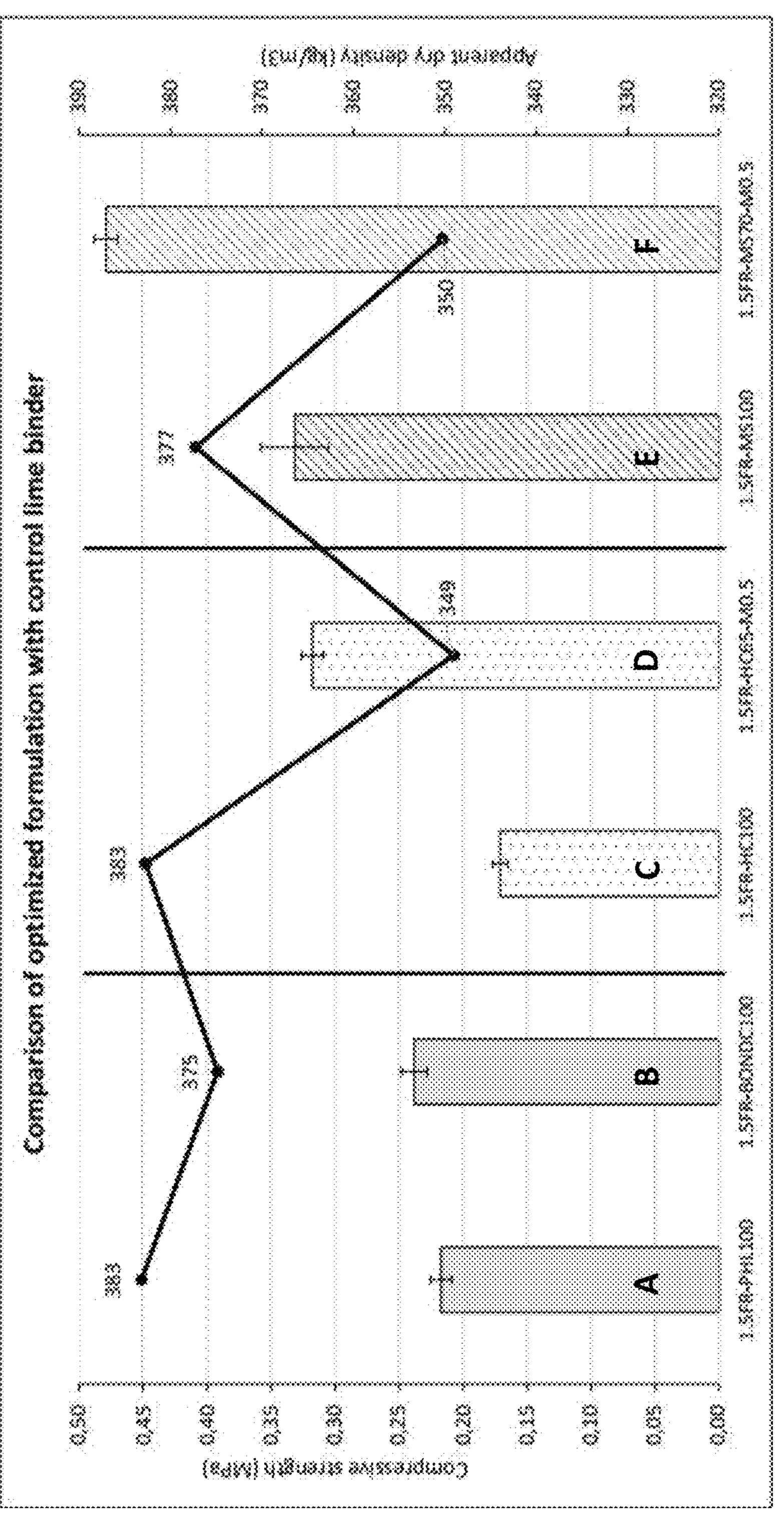
FIG. 2 is a graph showing compressive strength (left hand-side y axis; bar graph) and dry density (right hand-side y axis; solid black line) of solid plant-based concrete material samples prepared using different formulations labeled from A to F. Bars A and B are plant-based concrete material samples prepared using commercially available formulations. Bars C and D are solid plant-based concrete material samples prepared using 100% v/v type N lime (bar C) and 2:1 (v/v) type N lime:metakaolin with 0.5% by mass methylcellulose (bar D). Bar E and F are solid plant-based concrete material samples prepared using 100% type S lime (bar E) and 2.3:1 type S lime:metakaolin with 0.5% by mass methylcellulose (bar F)

The results of the compressive strength test for solid hemp-based concrete specimens prepared according to Example 3 are shown in FIG. 2. Formulation D, comprising 65% hydrated lime, 34.5% metakaolin and 0.5% methylcellulose (bar D) displayed greater compressive strength and lower dry density when compared to commercially available binder formulations comprising hemp (bars A and B) and to Formulation C (bar C) comprising type N hydrated lime and hemp but no additive agent.

Additionally, Formulation F, comprising 70% hydrated lime, 29.5% metakaolin and 0.5% methylcellulose (bar F) displayed improved compressive strength and decreased dry density when compared to commercially available binder formulations comprising hemp (bars A and B) and to Formulation E, which comprised hydrated lime and hemp hurds but no additive agent (bar E).

Unexpectedly, formulation D, comprising 65% of type N hydrated lime with the additive agent displays similar compressive strength, indicative of an improved external cohesion, when compared to type S hydrated lime with no additive agent (formulation E). It is also noticeable that the dry density of formulation D is lower than that of formulations C and E, indicative of an improved internal cohesion. When a hydrated lime of a different provenance or type is used (here, type S hydrated lime was used) the synergistic effects of the components of the additive agent are preserved: plant-based concrete specimen prepared using formulation F display improved compressive strength (external cohesion) and improved dry density (internal cohesion).

Example 5: Combined Effects of Pozzolan and Methylcellulose

The following binder formulations were prepared, following the protocol described in Example 3.

TABLE 1

Formulations comprising a binder having lime

| Formulation | Binder | Additive agent: Pozzolan | Additive agent: Methyl-cellulose |
|---|---|---|---|
| G | Type N lime 100% | — | — |
| H | Type N lime 70% | Metakaolin 30% | — |
| I | Type N lime 65% | Metakaolin 35% | — |
| J | Type N lime 60% | Metakaolin 40% | — |
| K | Type N lime 55% | Metakaolin 45% | — |
| L | Type N lime 70% | Metakaolin 29.5% | 0.5 |
| M | Type N lime 65% | Metakaolin 34.5% | 0.5 |
| N | Type N lime 60% | Metakaolin 39.5% | 0.5 |
| O | Type N lime 55% | Metakaolin 44.5% | 0.5 |
| P | Type S lime 100% | — | — |
| Q | Type S lime 80% | Metakaolin 20% | — |
| R | Type S lime 75% | Metakaolin 25% | — |
| S | Type S lime 72.5% | Metakaolin 27.5% | — |
| T | Type S lime 70% | Metakaolin 30% | — |
| U | Type S lime 65% | Metakaolin 35% | — |
| V | Type S lime 60% | Metakaolin 40% | — |
| W | Type S lime 55% | Metakaolin 45% | — |
| X | Type S lime 100% | — | 0.5 |
| Y | Type S lime 80% | Metakaolin 19.5% | 0.5 |
| Z | Type S lime 70% | Metakaolin 29.5% | 0.5 |
| AA | Type S lime 65% | Metakaolin 34.5% | 0.5 |
| AB | Type S lime 60% | Metakaolin 39.5% | 0.5 |
| AC | Type S lime 55% | Metakaolin 44.5% | 0.5 |

To establish the isolated and combined effects of the additive agent's components, the binder formulations according to Table 1 were prepared. The protocol set out in Example 3 was followed and the compressive test as described in Example 4 was performed.

Figure 3:
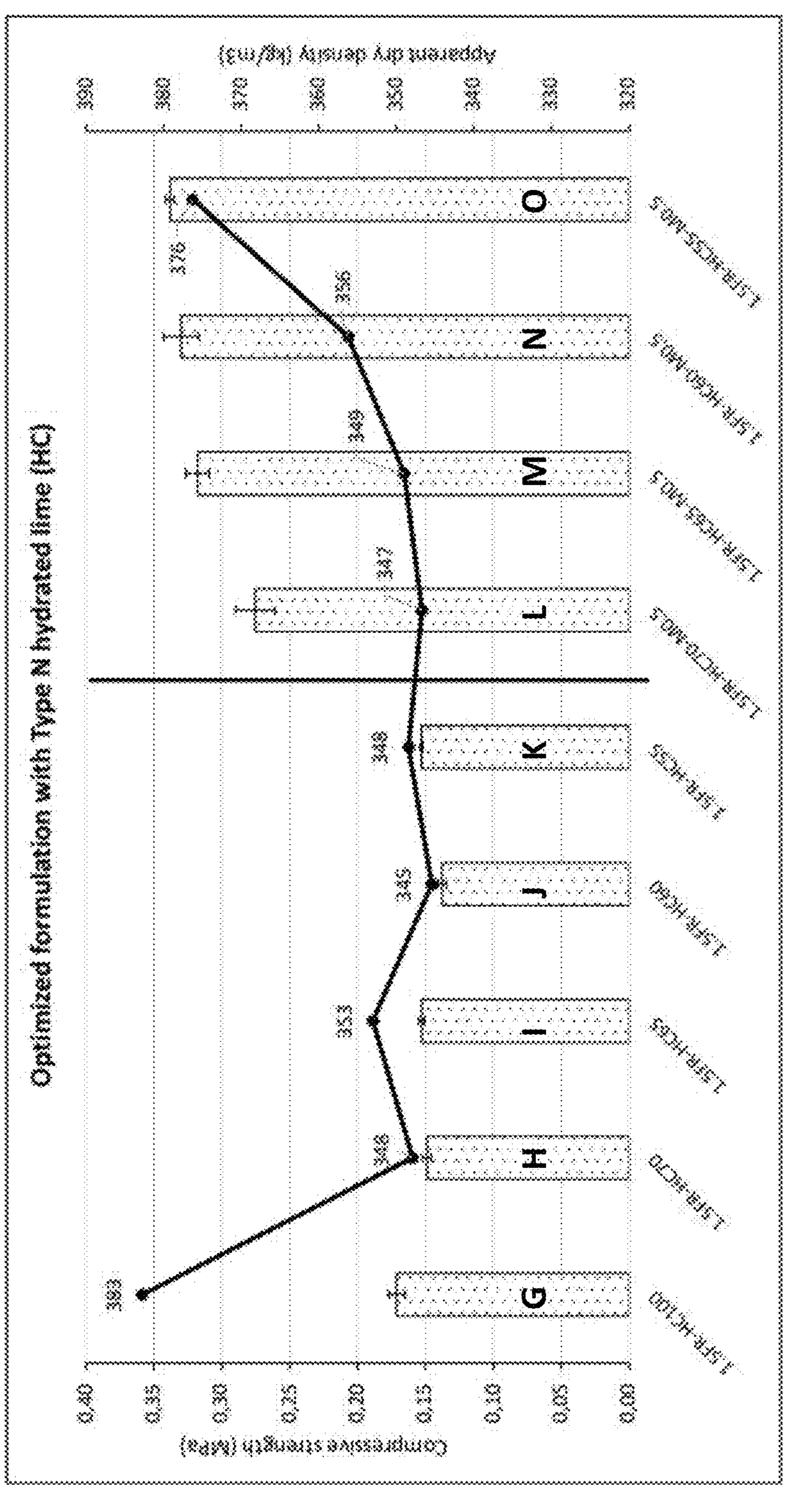
FIG. 3 is a graph showing compressive strength (left hand-side y axis, bar graph) and dry density (right hand-side y axis; solid black line) of solid plant-based concrete material samples prepared using a binder comprising type N hydrated lime with a high calcium (HC) content, according to Formulations G to O.
Figure 4:
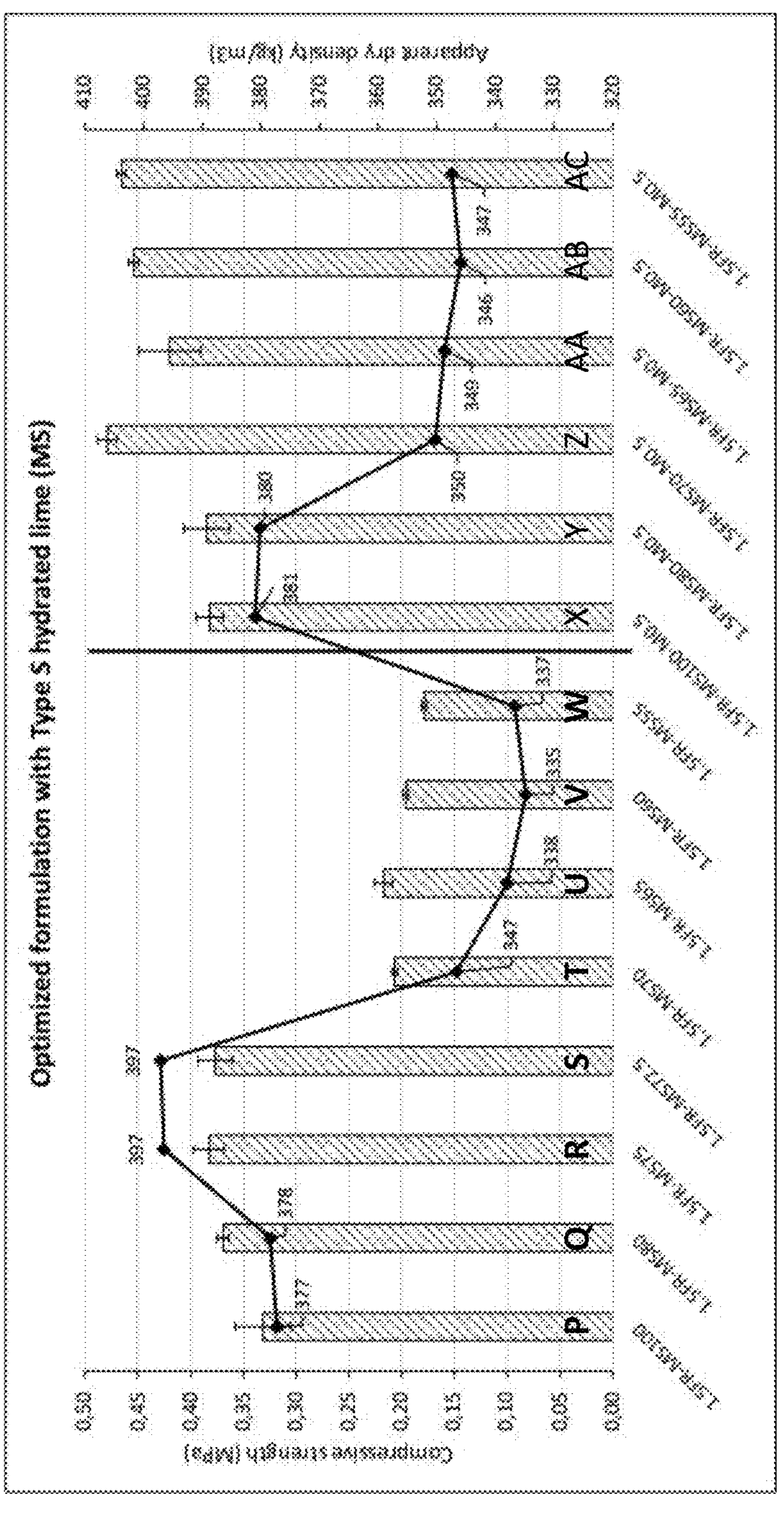
FIG. 4 is a graph showing compressive strength (left hand side y axis, bar graph) and dry density (right hand-side y axis, solid black line) of solid plant-based concrete material samples prepared using a binder comprising type S hydrated lime (MORTASEAL®) according to Formulations P to AC.

The results of the compressive strength test for solid plant-based concrete specimens prepared according to Formulations G to O are presented in FIG. 3. The results of the compressive strength test for solid hemp-based concrete specimens prepared according to Formulations P to AC are presented in FIG. 4.

Upon inclusion of an additive agent comprising a pozzolan (0-27.5% metakaolin) but no methylcellulose to the binder formulation, there is little to no change in compressive strength. When the pozzolan concentration reaches about 30%, the compressive strength declines, only to be rescued upon the inclusion of methylcellulose (formulations X, Y). The dry density, at least when about 30% pozzolan is included in combination with the methylcellulose, is then reduced. Binder formulations without or with methylcellulose do not display a dry density as low as when 30% or more pozzolan is included to the formulation. To obtain an optimal formulation, both components of the additive agent need to be present, that is the pozzolan and the methylcellulose.

Example 6: Preparation of Hemp-Based Concrete Using Binder Formulations Comprising an Additive Agent Having Pozzolan and Methylcellulose for a Variety of Applications For the preparation of hemp-based concrete, for manual application, formwork, molded, casted, or prefabricated, the following binder formulation may be used.

TABLE 2

Binder formulations for hemp-based concrete

| Binder Component | Percentage (%) mass ratio: Minimum | Percentage (%) mass ratio: Maximum |
|---|---|---|
| Hydrated lime (N or S) | 20 | 90 |
| Metakaolin | 10 | 80 |
| Methylcellulose | 0.2 | 1.0 |

For the preparation of hemp-based concrete, for manual application, molded, casted or formed, or prefabricated, the following preferred binder formulations may be used.

TABLE 3.1

| First preferred binder formulation for hemp-based concrete | |
|---|---|
| Binder Component | Percentage (%) mass ratio |
| Hydrated lime (N or S) | 66.5 |
| Metakaolin | 33 |
| Methylcellulose | 0.5 |

TABLE 3.2

| Second preferred binder formulation for hemp-based concrete | |
|---|---|
| Binder Component | Percentage (%) mass ratio |
| Hydrated lime (N or S) | 50 |
| Metakaolin | 49.3 |
| Methylcellulose | 0.7 |

For the preparation of shotcrete, gunite or sprayed hemp concrete, the following binder formulation may be used.

TABLE 4

| Binder formulations for hemp-based shotcrete | | |
|---|---|---|
| | Percentage (%) mass ratio | |
| Binder Component | Minimum | Maximum |
| Hydrated lime (N or S) | 20 | 80 |
| Metakaolin | 20 | 80 |
| Methylcellulose | 0.3 | 1.0 |

For the preparation of hemp concrete for 3D printing (3DCP), the following binder formulation may be used.

TABLE 5

| Binder formulations for 3DCP | | |
|---|---|---|
| | Percentage (%) mass ratio | |
| Binder Component | Minimum | Maximum |
| Hydrated lime (N or S) | 25 | 75 |
| Metakaolin | 25 | 75 |
| Methylcellulose | 0.4 | 1.5 |

Example 7: Proportions for Hemp-Binder-Water for Concrete Preparation

For the preparation of the applications recited above, the following proportions of binder, hemp chips and water may be used.

TABLE 6

| | Percentage (%) mass ratio | |
|---|---|---|
| Admixture component | Minimum | Maximum |
| Dry binder | 40 | 80 |
| Dry hemp (chips) | 20 | 60 |
| Water | 1.5 × dry binder mass | 3.0 × dry binder mass |

TABLE 7

| | Percentage (%) volume ratio | |
|---|---|---|
| Admixture component | Minimum | Maximum |
| Dry binder | 10 | 50 |
| Dry hemp (chips) | 50 | 90 |
| Water | 1.0 × dry binder volume | 2.0 × dry binder volume |

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. An additive agent for preparation of a solid concrete material, of a concrete mixture or of a binder formulation for the concrete mixture, consisting of metakaolin and methylhydroxyethyl cellulose.

2. The additive agent of claim 1, wherein the metakaolin: methylhydroxyethyl cellulose percentage dry mass ratio is about 98.5:1.5.

3. A combination for preparation of a solid concrete material, of a concrete mixture or of a binder formulation for the concrete mixture, consisting essentially of:
- an additive agent consisting of metakaolin and methylhydroxyethyl cellulose;
- a binder; and
- an aggregate having vegetal fibers.

4. A kit consisting essentially of:
- the additive agent of claim 1; and
- a binder having lime.

5. A solid concrete material consisting essentially of:
- an additive agent consisting of metakaolin and methylhydroxyethyl cellulose;
- a binder having hydrated lime; and
- an aggregate having vegetal fibers, wherein the aggregate and the additive agent are dispersed within the binder; and wherein the additive agent and the binder form a dry portion, the dry portion having:
- between 20% to 90% by weight of hydrated lime;
- between 10% and 80% by weight of metakaolin and
- between 0.2% and 1.5% by weight of methylhydroxyethyl cellulose.

6. The solid concrete material of claim 5, wherein the vegetal fibers are hemp hurds.

7. The solid concrete material of claim 6, wherein the hemp hurds represent between 20% and 50% by weight of the solid concrete material, between 30% and 50% by weight of the solid concrete material, or approximately 40% by weight of the solid concrete material; and/or wherein the hemp hurds are chips between 5 mm and 40 mm long by 2 mm to 10 mm wide, or between 20 mm to 30 mm long by 3 mm to 6 mm wide.

8. The solid concrete material of claim 5, wherein the dry portion has:
- between 50% to 80% by weight of hydrated lime;
- between 20% and 50% by weight of metakaolin; and
- between 0.3% and 1.0% by weight of methylhydroxyethyl cellulose, or
- between 65% to 66.5% by weight of hydrated lime;
- between 33% and 34.5% by weight of metakaolin; and
- 0.5% by weight of methylhydroxyethyl cellulose.

9. The solid concrete material of claim 5, wherein the dry portion has:

hydrated lime and metakaolin in a 2:1 ratio by weight; and 0.5% by weight of methylhydroxyethyl cellulose.

10. A method of making the solid concrete material of claim 5, comprising coating at least partially the vegetal fiber with a paste made of the additive agent, the binder and water.

11. A construction material comprising the solid concrete material of claim 5, the construction material having the form of a panel, a weight of the binder being between 1.5 and 2.5 times a weight of the aggregate in the panel.

12. A concrete mixture consisting essentially of an additive agent consisting of metakaolin and methylhydroxyethyl cellulose;

a binder having hydrated lime;

an aggregate having vegetal fibers; and water, wherein the aggregate is coated at least partially by a paste made of the additive agent, the binder and the water; and wherein the additive agent and the binder form a dry portion, the dry portion having:

between 20% to 90% by weight of hydrated lime;

between 10% and 80% by weight of metakaolin; and between 0.2% and 1.5% by weight of methylhydroxyethyl cellulose.

13. The concrete mixture of claim 9, wherein the vegetal fibers are hemp hurds.

14. The concrete mixture of claim 13, wherein the hemp hurds represent between 20% and 50% by weight of the concrete mixture, between 30% and 50% by weight of the concrete mixture, or approximately 40% by weight of the concrete mixture; and/or wherein the hemp hurds are chips between 5 mm and 40 mm long by 2 mm to 10 mm wide, or 20 mm to 30 mm long by 3 mm to 6 mm wide.

15. The concrete mixture of claim 12, wherein the dry portion has:

between 50% to 80% by weight of hydrated lime;

between 20% and 50% by weight of metakaolin; and between 0.3% and 1.0% by weight of methylhydroxyethyl cellulose.

16. A binder formulation for a concrete mixture of a hygroscopic vegetal-based concrete material, the binder formulation consisting essentially of:

an additive agent consisting of metakaolin and methylhydroxyethyl cellulose; and hydrated lime, and wherein proportions of the binder formulation are of:

between 20% to 90% by weight of hydrated lime;

between 10% and 80% by weight of metakaolin; and between 0.2% and 1.5% by weight of methylhydroxyethyl cellulose.

17. The binder formulation of claim 16, wherein proportions of the binder formulation are of:

between 50% to 80% by weight of hydrated lime;

between 20% and 45% by weight of metakaolin; and between 0.3% and 1.0% by weight of methylhydroxyethyl cellulose.

* * * * *